(12) United States Patent
Korsgaard

(10) Patent No.: US 6,338,505 B1
(45) Date of Patent: Jan. 15, 2002

(54) FLUID SWIVEL FOR OIL PRODUCTION VESSELS AND TANKER VESSELS

(76) Inventor: Jens Korsgaard, 318 N. Post Rd., Princeton Junction, NJ (US) 08550

( * ) Notice: Subject to any disclaimer, the term of this patent is extended or adjusted under 35 U.S.C. 154(b) by 0 days.

(21) Appl. No.: 09/486,187

(22) PCT Filed: Aug. 20, 1998

(86) PCT No.: PCT/US98/17244

§ 371 Date: May 15, 2000

§ 102(e) Date: May 15, 2000

(87) PCT Pub. No.: WO99/10226

PCT Pub. Date: Mar. 4, 1999

(51) Int. Cl.$^7$ .............................. F16L 55/00; B63B 35/00
(52) U.S. Cl. ....................... 285/119; 285/272; 141/230; 441/3
(58) Field of Search ................................. 285/119, 272; 141/387, 230, 293; 441/3, 4, 5; 405/169, 170, 171

(56) References Cited

U.S. PATENT DOCUMENTS

| | | |
|---|---|---|
| 3,477,746 A | 11/1969 | Watson |
| 3,909,047 A | 9/1975 | Salmela |
| 4,015,416 A | 4/1977 | Mori et al. |
| 4,436,048 A | 3/1984 | Gentry et al. |
| 4,597,595 A | 7/1986 | Wallace |
| 4,639,228 A * | 1/1987 | Bulow ........................... 441/5 |
| 4,643,462 A | 2/1987 | Wallace |
| 4,648,848 A | 3/1987 | Busch |
| 4,915,416 A | 4/1990 | Barrett et al. |
| 5,201,551 A | 4/1993 | Rumberger ........................... |

* cited by examiner

*Primary Examiner*—Eric K. Nicholson
(74) *Attorney, Agent, or Firm*—Kenyon & Kenyon

(57) ABSTRACT

A fluid swivel permitting a large number of revolutions, such as 20, and permitting a large number of fluid, power, and signal paths. The swivel is leak proof and capable of resisting large internal pressures in the conveyed fluid such as 70 MPa. The pipes of the swivel are spooled between two cones in such a manner that the pipe on one cone is spooled from the top down and on the other cone from the bottom up. This method of spooling ensures a constant distance between the unwinding point on one cone and the winding point on the other cone. By providing cones with the apex pointing up, the spooled flexible pipe on either cone is prevented from falling down. An alternative embodiment spools between two cylinders with a common axis. In this embodiment the pipe spooled on one cylinder is supported by a structure resting on the pipe spooled on the other cylinder, thereby preventing the pipe on either cylinder from falling down. Yet another embodiment spools between two cylinders provided with helically formed shelves. In this embodiment the pipes spooled on the cylinders are supported by the helically formed shelves. The invention removes the limitation on existing type 5 swivels of only being able to practically store two wraps of pipe on each spool to permitting 10 or more wraps on each spool thereby making the number of revolutions end to end 20 or more.

29 Claims, 6 Drawing Sheets

FLUID SWIVEL FOR OIL PRODUCTION VESSELS AND TANKER VESSELS

BACKGROUND OF THE INVENTION

1. Field of the Invention

This invention relates generally to the transfer of fluids, electric and hydraulic power, and signals between installations on the sea bed and a weathervaning vessel that is moored to a single point mooring. The primary application of the invention is for offshore oil production vessels that are moored to a single point mooring or a turret and to oil tankers that are moored to single point moorings.

The invention relates to the fluid swivel required in the conduits and cables connecting the systems aboard the weathervaning vessel to the sub sea systems.

2. BACKGROUND ART

In recent years a number of systems have been developed to moor vessels offshore in high sea states. These systems generally provide for the mooring of oil tankers and oil production and storage vessels such that they are moored to a single point (such as a single point mooring or a turret mooring). The vessels are typically designed to be able to freely weather vane about the mooring. Typically the vessel is connected with fluid, power, and signal connections to sub sea systems. Because the vessel can freely rotate, swivels must be incorporated in the said fluid, power, and signal connections.

Typically there are 5 to 10 fluid connections and a large number of signal connections, however, the number of fluid connections may range from one to more than 30. A number of solutions to this swivel problem exists in the known art as follows:

1. Multiple ball bearing or roller bearing type swivels stacked one on top of each other such that they all have one common (usually vertical) axis. All conduits must pass through the center of the lowest swivel, all but one must pass through the center of the next lowest swivel, and so on.
2. Numerous flexible conduits of the type manufactured by COFLEXIP deployed in a cylindrical drum and subject to twisting, such as for example described in U.S. Pat. Nos. 5,201,551 and 4,648,848.
3. Numerous flexible conduits of the type manufactured by COFLEXIP reeled onto or off a drum with a vertical axis and that are maintained in tension by an idler drum with a vertical axis and moved horizontally with respect to the first drum as described in U.S. Pat. No. 4,436,048.
4. Numerous flexible conduits of the type manufactured by COFLEXIP deployed spirally on a plane or slightly conical surface where the two ends of the conduits rotate relative to one another by winding or unwinding the spiral similar to a clock spring as described in U.S. Pat. No. 4,015,416.
5. Numerous flexible conduits of the type manufactured by COFLEXIP transferred between two coaxially deployed cylinders and being transferred between the two cylinders by means of an intermediate spooling device mechanically coupled to both cylinders such that the spooling device rotates with the average rotational speed of the two cylinders as described in U.S. Pat. Nos. 4,643,462 and 4,597,595.

Swivels of the first type can rotate an unlimited number of revolutions in either direction. However, for multiple paths this type of swivel has the disadvantage of being heavy and prone to leaks. It also has limited internal pressure capability of up to about 35 MPa.

Swivels of the types 2 through 5 are all limited number of revolutions swivels. They can practically only be designed for 6 to 8 revolutions before reaching the limit. They are all heavy with the exception of type 5. Type 5 as described in U.S. Pat. Nos. 4,643,462 and 4,597,595 has a practical limit of revolutions on the order of 4 to 6 revolutions.

SUMMARY OF THE INVENTION

An object of the present invention is to make a limited number of revolutions swivel permitting a large number of revolutions such as 20 and permitting a large number of fluid, power, and signal paths. A further object is to make the swivel leak proof and capable of resisting large internal pressures in the conveyed fluid such as 70 MPa.

These and other objects are achieved by providing a swivel of type 5 as described above but rather than spooling the pipes between two cylinders the pipes are spooled between two cones in such a manner that the pipe on one cone is spooled from the top down and on the other cone from the bottom up. This method of spooling ensures a constant distance between the unwinding point on one cone and the winding point on the other cone. By providing cones with the apex pointing up the spooled flexible pipe on either cone is prevented from falling down.

An alternative embodiment spools between two cylinders with a common axis. In this embodiment the pipe spooled on one cylinder is supported by a structure resting on the pipe spooled on the other cylinder, thereby preventing the pipe on either cylinder from falling down.

Yet another embodiment spools between two cylinders provided with helically formed shelves. In this embodiment the pipes spooled on the cylinders are supported by the helically formed shelves.

The invention removes the limitation on existing type 5 swivels of only being able to practically store two wraps of pipe on each spool to permitting 10 or more wraps on each spool thereby making the number of revolutions end to end 20 or more. Because there are no rotating seals in the swivel according to this invention and because the swivel may use pipe of the type manufactured by COFLEXIP, the pressure limitations for the swivel are basically the same as for COFLEXIP type pipe.

BRIEF DESCRIPTIONS OF THE DRAWINGS

DETAILED DESCRIPTIONS OF THE PREFERRED EMBODIMENTS

Figure 1:
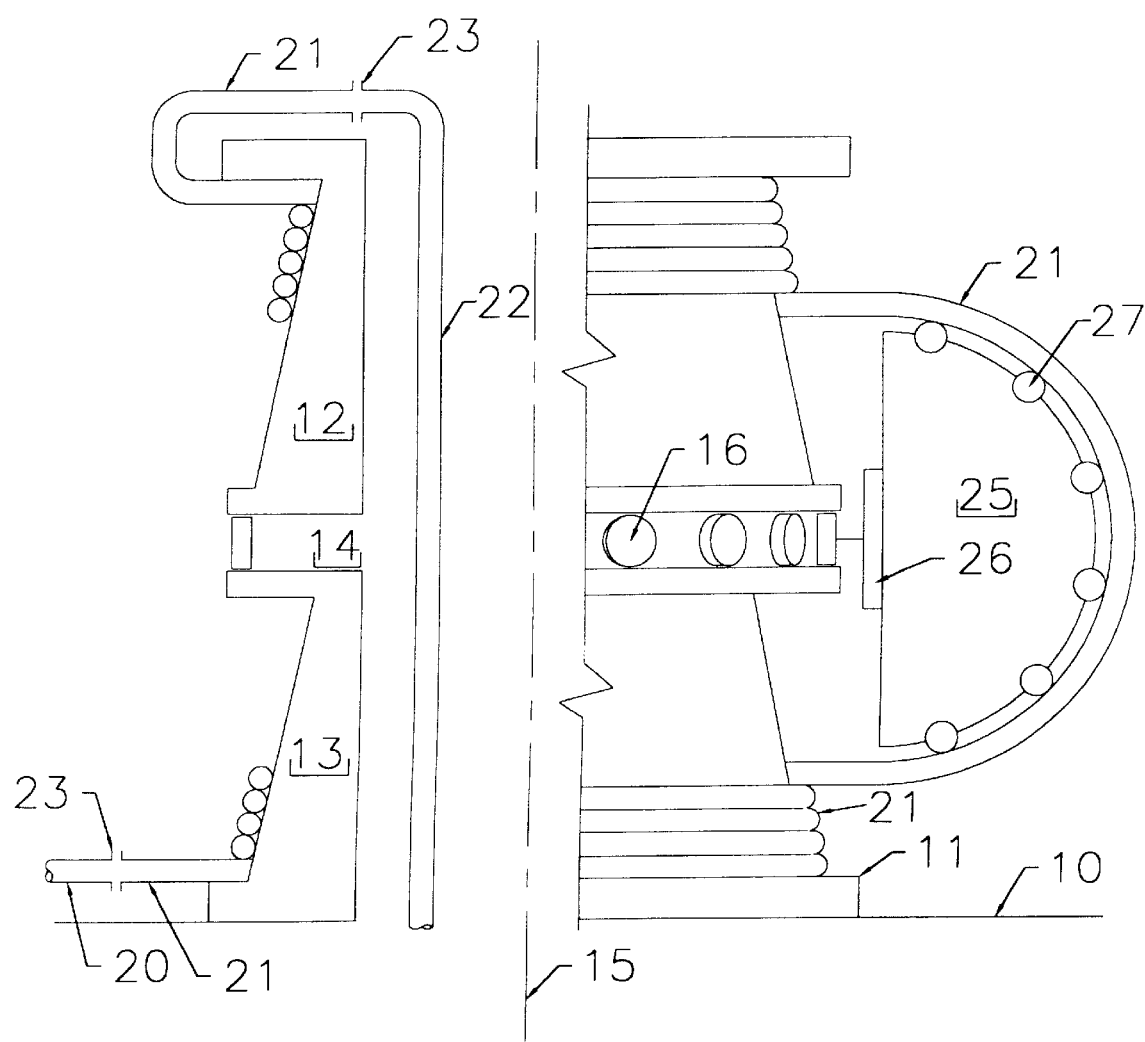
FIG. 1 shows a side view of a swivel of a first embodiment consisting of spooling one pipe between two conical surfaces.

FIG. 1 shows a side view of the first embodiment of the invention. A fluid swivel 11 according to this invention is mounted on a surface 10 which may be the deck of a ship (not shown). The fluid swivel 11 is comprised of two parts 12 and 13 separated by a roller bearing 14. The two parts 12 and 13 are substantially identical and each consists of a conical surface with the apex point up. The lower cone 13 is fixed to the surface 10. The upper cone 12 may rotate relative to the lower cone on the common rotational axis of symmetry 15. The rollers 16 in roller bearing 14 in consequence rotates about the axis 15 at exactly ½ the rotational speed of the cone 12.

Piping 20 which is fixed to the surface 10 is connected to flexible piping 21. The flexible piping 21 is wound onto the lower part of cone 13 then curving over a spooling device 25 onto the upper part of cone 12 where it 21 is wound onto the upper part of cone 12. After a number of windings the flexible pipe 21 connects above the cone to the pipe 22. There is therefore continuous fluid connection from pipe 20 to pipe 22 through flexible pipe 21. There are no connectors in this piping system other than connectors 23. The connectors 23 may for example be flanges. The pipe 22 rotates with the rotational axis 15 relative to pipe 20 with the same rotational speed as cone 12. Because the spooling device 25 rotates at ½ the speed of cone 12, one winding on cone 13 is wound or unwound for each two revolutions of cone 12. As a consequence, the fluid swivel 11 may rotate end to end a number of revolutions that is two times the sum of the number of windings on cones 12 and 13. The swivel 11 in FIG. 1 is shown with a total of 9 windings, therefore this swivel may make 18 turns end to end. At one limit of rotation all windings of pipe 21 are on cone 12 and at the other limit of rotation all windings of pipe 21 are on cone 13.

The spooling device 25 is coupled to the bearing 14 such that it rotates about the axis 15 with the same speed as the rollers 16. The spooling device may be equipped with one or more guide rollers 27 that guide the flexible pipe 21 when it is transferred between the cones 12 and 13. Alternatively, the spooling device 25 may be equipped with gear wheels meshing with gears on the cones 12 and 13. The spooling device 25 may be equipped with a mechanism 26 that automatically lowers or raises the spooling device such that it maintains a constant elevation relative to the upper winding on cone 13.

The spooling device 25 maintains a suitable tension in the flexible pipe 21. This tension combined with the friction between pipe 21 and cone 12 prevents the pipe from sliding down on cone 12. Because cones 12 and 13 have the same radius at the winding and unwinding points (not visible) there is no tendency to slacken or tighten the pipe 21 as it is transferred between the cones 12 and 13. The system however is self adjusting. In the event of slack in flexible pipe 21 a slightly lower winding position or unwinding position will be assumed on cone 12. In the event of tension in pipe 21 the pipe will elongate slightly due to its elasticity and be wound tightly onto the cone 12 or cone 13 onto which the flexible pipe 21 is wound.

Figure 2:
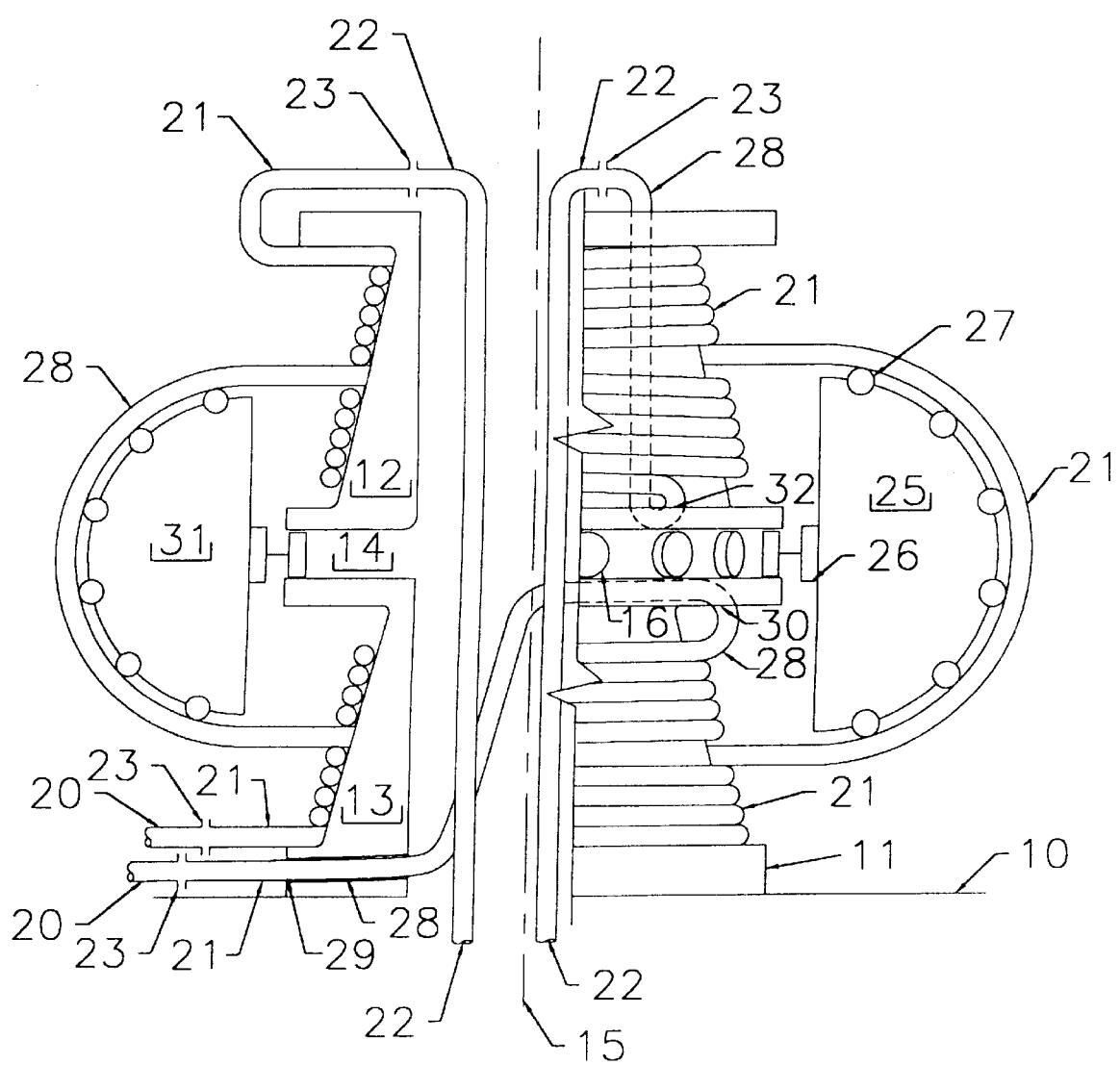
FIG. 2 shows a side view of a swivel of a second embodiment consisting of spooling two or more pipes between two conical surfaces.

FIG. 2 shows a second embodiment that is similar to the embodiment in FIG. 1 with the exception that two flexible pipes 21 are wound onto the cones 12 and 13. The pipes 21 may be housed together in a prismatic flexible cover. The vessel 10 has in this embodiment two pipes 20 connecting through connectors 23 to flexible pipes 21. One pipe 21 is wound as shown on FIG. 1. The other pipe 21 labeled 28 is carried through hole 29 in cone 13 through the interior of cone 13 in a manner that it does not interfere with pipes 22. The pipe 28 exits from the interior of cone 13 through hole 30 near the upper end of cone 13 and is wound onto the upper exterior part of cone 13. The pipe 28 is transferred via a spooling device 31 onto the lower part of cone 12. The spooling device 31 is mounted in like manner and functions in like manner to the spooling device 25 described in FIG. 1. At the lower end of cone 12 the pipe 28 is carried into the interior of cone 12 through hole 32. The pipe 28 is carried though the interior part of cone 12 to a second pipe 22. It is connected with a connector 23 to the second pipe 22. In this embodiment two independent fluid paths have been established through pipes 21 and 28 through fluid swivel 11 between pipes 20 and pipes 22.

Additional pipes (not shown) similar to pipes 21 and 28 may be wound onto cones 12 and 13 on the outside of pipes 21 and 28 and deployed in similar manner to pipes 21 and 28. These additional pipes (not shown) may be carried between the two cones 12 and 13 by spooling devices 25 and 31. In this manner a large number of independent fluid paths may be incorporated into fluid swivel 11.

Figure 3:
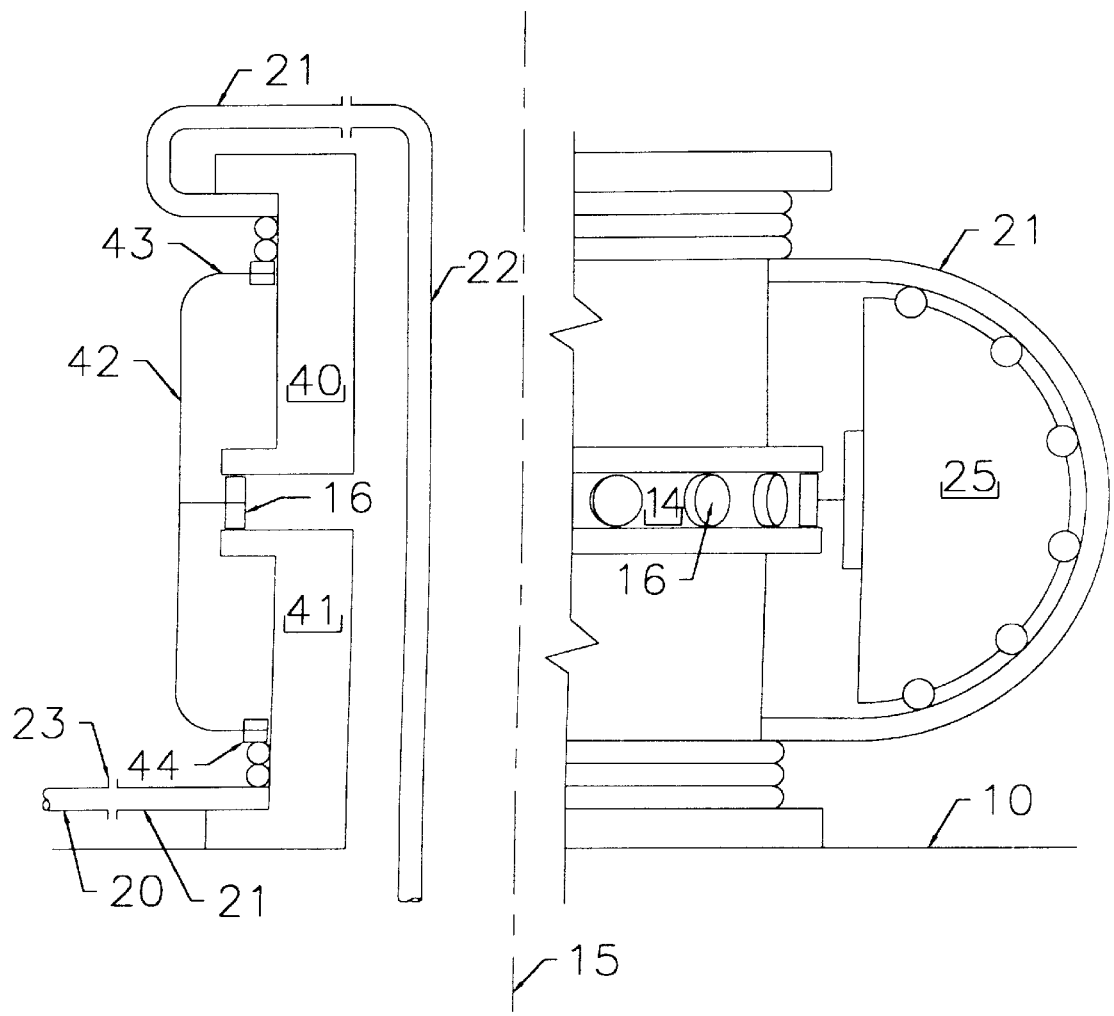
FIG. 3 shows a side view of a swivel of the third embodiment consisting of spooling one pipe between two cylindrical surfaces.

FIG. 3 shows a third embodiment which is similar to the embodiment in FIG. 1 except the pipe 21 is wound onto two cylinders 40 and 41. In this embodiment the pipe 21 could slide down on the upper cylinder 40. This is prevented by a support bar 42 fitted with wheels 43 and 44 maintaining a constant distance between the lower wrap of pipe 21 on cylinder 40 and the upper wrap of pipe 21 on cylinder 41. The support bar 42 is mechanically connected to one or more wheels 16 in roller bearing 14 such that it rotates about the axis 15 with half the rotational speed of cylinder 40. The support bars 42 may be interconnected by connectors (not shown) that maintain their alignment parallel to the axis 15.

Figure 4:
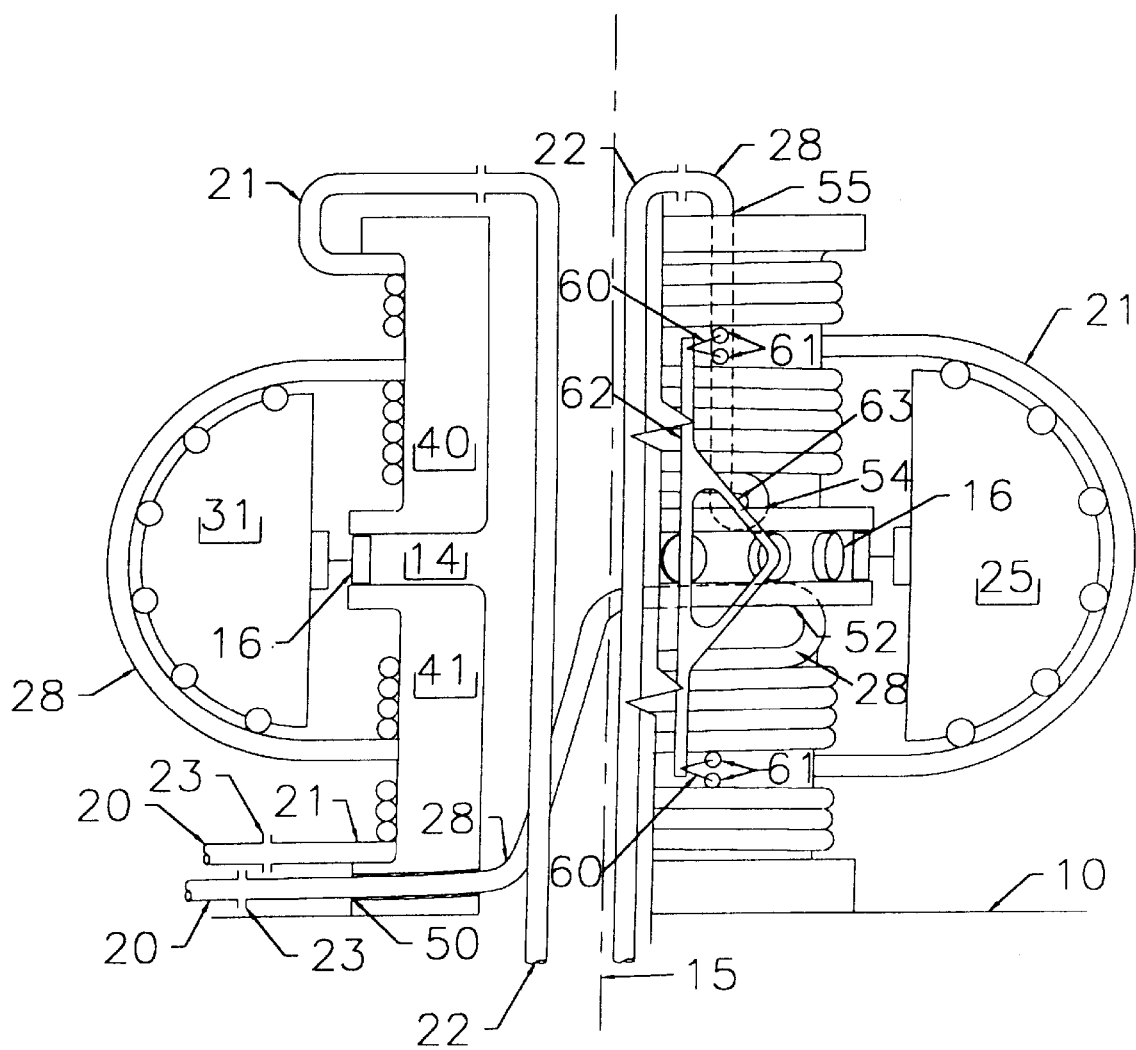
FIG. 4 is a side view of a fourth embodiment consisting of spooling two or more pipes between two cylindrical surfaces.

FIG. 4 shows a fourth embodiment which is similar to the embodiment shown in FIG. 2 except the pipes 21 and 28 are wound onto two cylinders 40 and 41. In this embodiment the pipe 20 is connected at coupler 23 to the flexible pipe 21 similar to the manner shown in FIG. 3. The pipe 28 is threaded through the interior part of cylinder 41 entering at hole 50 and exiting at hole 52. Similar to the manner shown in FIG. 2 the pipe 28 is transferred via spooling device 31 to the upper cylinder 40. At the lower part of cylinder 40 the flexible pipe 28 is threaded though the interior of cylinder 40 entering at hole 54 and exiting at hole 55.

In FIG. 4 the wraps of pipe 28 that is wrapped onto the lower part of cylinder 40 supports the wraps of pipe 21 which is wrapped onto the upper part of cylinder 40 through support bars 60 and support wheels 61 rolling on pipes 28 and 21. In a similar way pipe 21 supports pipe 28 on the other cylinder 41. Many sets of support bars 60 are usually used but only two are shown for clarity on FIG. 4. The upper and lower support bars 60 are connected by structural element 62 which is connected by structural element 63 to the rollers 16 in bearing 14. Thus the bars 60 remain in a fixed position relative to spooling devices 25 and 31. The support bars 60 may be connected by structures (not shown) that maintain their orientation relative to the axis of rotation 15.

Figure 5:
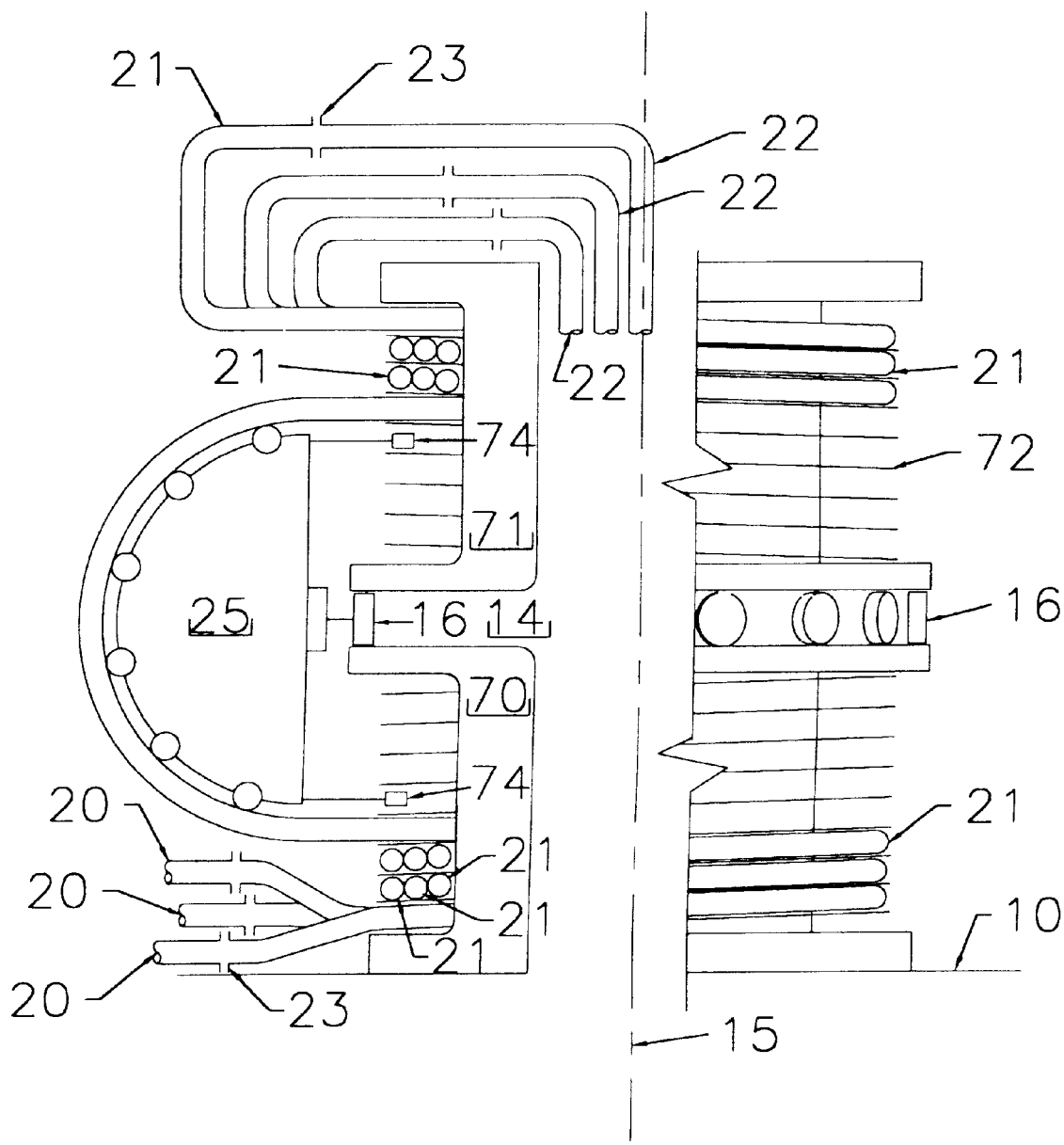
FIG. 5 is a side view of a fifth embodiment consisting of spooling one or more pipes between two cylinders fitted with helically formed shelves

FIG. 5 shows yet another embodiment of the invention similar to the embodiments in FIGS. 3 and 4 in which the wraps of flexible pipe 21 and 28 are stored on helical shelves 72. Three flexible pipes 21 provide a fluid connection between pipes 20 on the surface 10 and the pipes 22 that may rotate about the vertical axis 15. FIG. 5 shows a flexible pipe configuration similar to the configurations in FIGS. 1 and 3. Additional pipes may be added similar to the configuration in FIGS. 2 and 4. In this manner the fluid swivel shown on FIG. 5 would provide 6 fluid paths that may be rotated 14 times about axis 15. By making the helical shelves wider additional fluid paths may accommodated. Therefore, as shown in FIG. 5, multiple layers are wound on the cylinders 70 and 71.

The helical shelves 72 provide a particularly simple way of controlling the vertical position of the spooling device 25 by supporting the spooling device 25 through rollers 74 rolling on the helical shelves.

Figure 6:
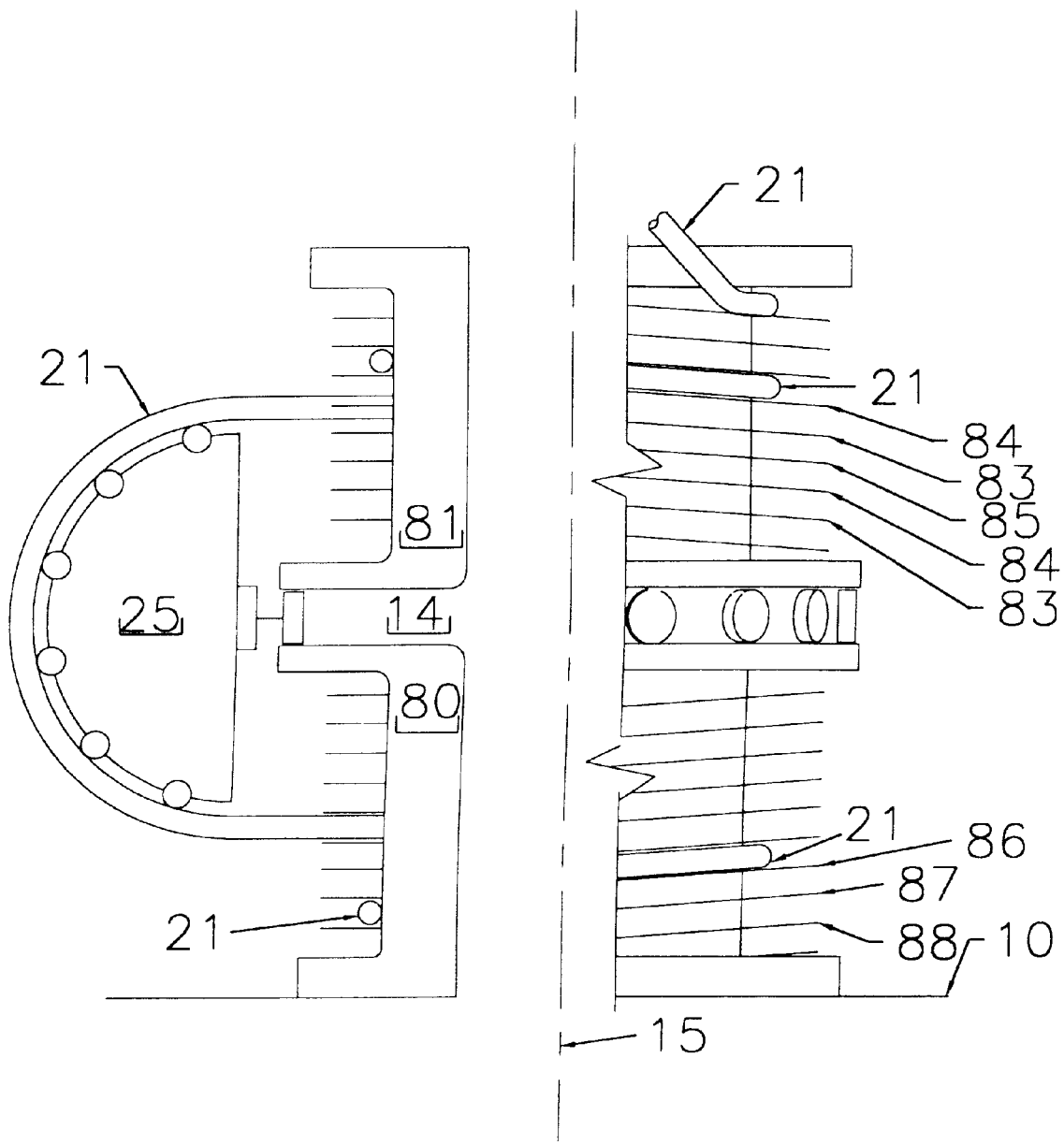
FIG. 6 shows a side view of a sixth embodiment consisting of spooling numerous pipes between two cylinders fitted with two or more helically formed shelves.

FIG. 6 shows yet another embodiment similar to the embodiment in FIG. 5. This embodiment is similar to the embodiment in FIG. 5. This embodiment consists of two cylinders 80 and 81 separated by a bearing 14. The cylinder 80 is fitted with two or more helical shelves. FIG. 5 shows the cylinder 80 fitted with three helical shelves 36, 87, and 88. The cylinder 81 is likewise fitted with three helical shelves 83, 84, and 85.

The swivel in FIG. 6 can, if it is assumed that each shelf carries three pipes 21, accommodate 18 separate fluid paths. For clarity only one such path is illustrated on FIG. 6. Flexible pipe 21 goes from the deck 10 onto shelf 86 on cylinder 80. From there it passes via the spooling device 25 onto shelf 84 on cylinder 81, terminating on top of cylinder 81. As illustrated on FIG. 6 the swivel can make 4 turns end to end. However, any number of turns can be obtained by making the device higher. Likewise any number of fluid paths can be obtained by increasing the number of helical shelves 86, 87, 88, 83, 83, and 85 on the cylinders 80 and 81.

In the above description of the invention, those skilled in the art will perceive improvements, changes and modifications. Improvements, changes and modifications within the skill of the art are intended to be covered by the claims.

What is claimed is:

1. A fluid swivel comprising:
   at least two cones rotating relative to one another about a common axis of symmetry, each cone having an apex, the apexes pointing in a same direction;
   at least one flexible conduit extending between the at least two cones, the conduit being wound in a first direction in a helical shape onto a lower part of one of the cones, the conduit also being wound in an opposite direction in a helical shape onto an upper part of another of the cones;
   at least one guide rotating about the axis of the cones, the guide guiding the conduit from one cone to another cone.

2. The fluid swivel of claim 1, wherein the guide rotates at an average speed of rotation of the cones.

3. The fluid swivel of claim 1, wherein the guide includes gear wheels and wherein the cones include gears, and wherein the guide is supported by the gear wheels engaging the gears on the cones.

4. The fluid swivel of claim 1, wherein the flexible conduit includes multiple conduits within one prismatic flexible cover.

5. The fluid swivel of claim 4, wherein the multiple conduits are wound on the cones in multiple layers.

6. The fluid swivel of claim 4, wherein the multiple conduits are wound on the cones in a single layer including multiple helixes.

7. The fluid swivel of claim 4, wherein multiple conduits are wound on the cones in multiple layers, with each layer including multiple helixes.

8. A fluid swivel comprising:
   at least two cylinders rotating relative to one another about a common axis of rotational symmetry;
   at least one flexible conduit extending between the at least two cylinders, the conduit being wound in one direction in a helical shape onto a lower part of one of the cylinders and being wound in an opposite direction in a helical shape onto an upper part of another of the cylinders;
   at least one guide rotating about the axis of the cylinders, the guide guiding the conduit from one of the cylinders to another of the cylinders.

9. The fluid swivel of claim 8, wherein the guide rotates at an average speed of rotation of the cylinders.

10. The fluid swivel of claim 8, wherein the guide includes gear wheels and wherein the cylinders include gears, and wherein the guide is supported by the gear wheels engaging the gears on the cylinders.

11. The fluid swivel of claim 8, wherein the guide is supported by the conduit on one of the cylinders and supports the conduit on another of the cylinders.

12. The fluid swivel of claim 8, wherein the at least one conduit includes multiple conduits within one prismatic flexible cover.

13. The fluid swivel of claim 8, wherein multiple conduits are wound on the cylinders in multiple layers.

14. The fluid swivel of claim 8, wherein multiple conduits are wound on the cylinders in a single layer including multiple helixes.

15. The fluid swivel of claim 8, wherein multiple conduits are wound on the cylinders in multiple layers, and wherein each layer includes multiple helixes.

16. The fluid swivel of claim 8, wherein the cylinders include helical shelves which support the conduit.

17. The fluid swivel of claim 16, wherein the guide is supported on the helical shelves.

18. The fluid swivel of claim 16, wherein the shelves are sufficiently wide to support multiple layers of conduits.

19. The fluid swivel of claim 18, wherein each cylinder is fitted with multiple shelves.

20. The fluid swivel of claim 8, wherein two conduits are wound onto opposite ends of each cylinder and fitted with two guides.

21. The fluid swivel of claim 20, wherein the guides are supported by the conduit on one of the cylinders and support the conduit on another of the cylinders.

22. The fluid swivel of claim 20, wherein the guides are supported by the conduit on one of the cylinders and support another conduit on the one of the cylinders.

23. The fluid swivel of claim 20, wherein multiple conduits are wound on the cylinders in multiple layers.

24. The fluid swivel of claim 20, wherein multiple conduits are wound on the cylinders in a single layer including multiple helixes.

25. The fluid swivel of claim 20, wherein multiple conduits are wound on the cylinders in multiple layers, and wherein each layer includes multiple helixes.

26. The fluid swivel of claim 20, wherein the cylinders are fitted with helical shelves which support the conduits.

27. The fluid swivel of claim 26, wherein the guides are supported on the helical shelves.

28. The fluid swivel of claim 26, wherein the shelves are sufficiently wide to support multiple layers of the conduits.

29. The fluid swivel of claim 26, wherein each cylinder is fitted with multiple shelves.

* * * * *